（12）United States Patent
Van Latum et al.

(10) Patent No.: US 11,187,547 B2
(45) Date of Patent: Nov. 30, 2021

(54) TIRE CONDITIONING OPTIMIZATION FOR A COLLECTION OF MINING VEHICLES

(71) Applicant: Modular Mining Systems, Inc., Tucson, AZ (US)

(72) Inventors: Lucas Van Latum, Tucson, AZ (US); Maria Brenda R. Rayco, Tucson, AZ (US)

(73) Assignee: MODULAR MINING SYSTEMS, INC., Tucson, AZ (US)

( * ) Notice: Subject to any disclaimer, the term of this patent is extended or adjusted under 35 U.S.C. 154(b) by 0 days.

(21) Appl. No.: 16/737,696

(22) Filed: Jan. 8, 2020

(65) Prior Publication Data

US 2020/0141745 A1 May 7, 2020

Related U.S. Application Data

(63) Continuation of application No. 15/215,214, filed on Jul. 20, 2016, now Pat. No. 10,533,866.
(Continued)

(51) Int. Cl.
*G01C 21/34* (2006.01)
*G08G 1/00* (2006.01)
(Continued)

(52) U.S. Cl.
CPC .......... *G01C 21/3461* (2013.01); *B60C 23/04* (2013.01); *B60C 23/0479* (2013.01);
(Continued)

(58) Field of Classification Search
None
See application file for complete search history.

(56) References Cited

U.S. PATENT DOCUMENTS

2006/0025897 A1* 2/2006 Shostak ................. G08G 1/017 701/1
2006/0220813 A1 10/2006 Utter et al.
(Continued)

FOREIGN PATENT DOCUMENTS

EP 1829714 B1 6/2010

*Primary Examiner* — Christian Chace
*Assistant Examiner* — Jordan S Fei
(74) *Attorney, Agent, or Firm* — Quarles & Brady LLP

(57) ABSTRACT

A system and method includes accessing a road network database to identify a tire cost for a plurality of edges in a mining road network, identifying least-cost paths between each of a plurality of nodes on the mining road network using the tire cost for each of the plurality of edges, the nodes including a loading area and a dumping area for a plurality of haul trucks, accessing a distributed objects database to identify constraints for the nodes on the mining road network, determining a production plan using the constraints for the nodes on the mining road network by maximizing a function of the form $\alpha f'(x) - \beta g'(x)$, where $f'(x)$ is a normalized measure of productivity, $g'(x)$ is a normalized measure of impact on tire conditioning, and $\alpha$ and $\beta$ are nonnegative constants with $\alpha + \beta = 1$, subject to constraints on resource capacities and production requirements, with the material flow rates between each of the nodes on the mining road network specifying the production plan, determining a task assignment for each of the plurality of haul trucks using the production plan as guide, and transmitting the task assignment for each of the plurality of haul trucks.

12 Claims, 7 Drawing Sheets

Related U.S. Application Data

(60) Provisional application No. 62/195,732, filed on Jul. 22, 2015.

(51) Int. Cl.
| | | |
|---|---|---|
| *B60C 23/04* | (2006.01) | |
| *G07C 5/00* | (2006.01) | |
| *B60C 23/20* | (2006.01) | |
| *G01C 21/36* | (2006.01) | |
| *G07C 5/08* | (2006.01) | |
| *G08G 1/0967* | (2006.01) | |

(52) U.S. Cl.
CPC .......... *B60C 23/20* (2013.01); *G01C 21/3453* (2013.01); *G01C 21/362* (2013.01); *G07C 5/008* (2013.01); *G07C 5/0808* (2013.01); *G08G 1/20* (2013.01); *G08G 1/202* (2013.01); *G05D 2201/0202* (2013.01); *G08G 1/096716* (2013.01); *G08G 1/096741* (2013.01); *G08G 1/096775* (2013.01)

(56) References Cited

U.S. PATENT DOCUMENTS

| | | | |
|---|---|---|---|
| 2007/0193349 A1 | 8/2007 | Petrucelli | |
| 2016/0047666 A1* | 2/2016 | Fuchs | G06Q 40/08 |
| | | | 701/423 |
| 2016/0290815 A1* | 10/2016 | Tang | G01C 21/3697 |

* cited by examiner

TIRE CONDITIONING OPTIMIZATION FOR A COLLECTION OF MINING VEHICLES

CROSS-REFERENCE TO RELATED APPLICATIONS

This application is a continuation of U.S. patent application Ser. No. 15/215,214 entitled "TIRE CONDITIONING OPTIMIZATION FOR A COLLECTION OF MINING VEHICLES" and filed on Jul. 20, 2016, which claims priority to U.S. Provisional Patent Application No. 62/195,732 entitled "TIRE CONDITIONING OPTIMIZATION FOR A COLLECTION OF MINING VEHICLES," and filed on Jul. 22, 2015.

FIELD OF THE INVENTION

This disclosure is related to systems and methods for tire management for vehicles within a mining environment and specifically to a system and method for executing vehicle dispatch routines so that tire conditioning may be optimized.

BACKGROUND OF THE INVENTION

Mining environments, particularly open pit surface mining environments, present unique challenges to maintaining safe and efficient operation of vehicles. The workhorse of a modern surface mine is a mine haul truck, which is a dump truck capable of hauling hundreds of tons of material. Haul trucks are among the largest land vehicles ever built, and, as such, are characterized by limited maneuverability, relatively slow acceleration and deceleration, poor sight lines on each side of the vehicle, and relatively low fuel efficiency. Other vehicles, such as shovels, bulldozers, and bucket wheel excavators are similarly difficult to control. The vehicles are large, with wide turning radii, and slow braking and accelerating capabilities.

At any one time, a large number of vehicles may be working within a particular mine. During operation, each vehicle will move to different locations within the mine to retrieve material, dump material, or to assist in various operations. While navigating between different locations, each vehicle will travel along a particular route following one or more of the roadways or designated throughways of the mine. In some cases, a centralized control or dispatch system is arranged to assign each vehicle to a particular route and to a particular task.

The tires of wheeled vehicles are an important component to mining operations and are an important element in determining safety and health conditions in a mine. Tires can also be expensive and scarce. At the same time, mining is a capital intensive and operationally costly enterprise. It therefore can be essential that mining operations be planned and executed so that equipment utilization levels are high and production objectives are achieved. A key element to this is a system arranged to operate and dispatch vehicles in a manner so that desired production levels are maintained and tire conditioning is optimized.

Increased equipment utilization and decreased tire-related costs are benefits from tire conditioning optimization. Another benefit is the reduction of associated costs such as fuel costs. Mine safety improvement is another benefit.

SUMMARY OF THE INVENTION

This disclosure is related to systems and methods for tire management for vehicles within a mining environment and specifically to a system and method for executing vehicle dispatch routines so that tire conditioning is optimized.

In one implementation, the present invention is a method including accessing a road network database to identify a tire cost for a plurality of edges in a mining road network, identifying least-cost paths between each of a plurality of nodes on the mining road network using the tire cost for each of the plurality of edges, the nodes including a loading area and a dumping area for a plurality of haul trucks, accessing a distributed objects database to identify constraints for the nodes on the mining road network, determining a production plan using the constraints for the nodes on the mining road network by maximizing a function of the form $\alpha f'(x) - \beta g'(x)$, where $f'(x)$ is a normalized measure of productivity, $g'(x)$ is a normalized measure of impact on tire conditioning, and $\alpha$ and $\beta$ are nonnegative constants with $\alpha + \beta = 1$, subject to constraints on resource capacities and production requirements, with the material flow rates between each of the nodes on the mining road network specifying the production plan, determining a task assignment for each of the plurality of haul trucks using the production plan as guide, and transmitting the task assignment for each of the plurality of haul trucks.

Other advantages and features of the invention will be apparent to those having ordinary skill in the art upon reading the following detailed description and claims.

DETAILED DESCRIPTION OF THE INVENTION

Figure 1:
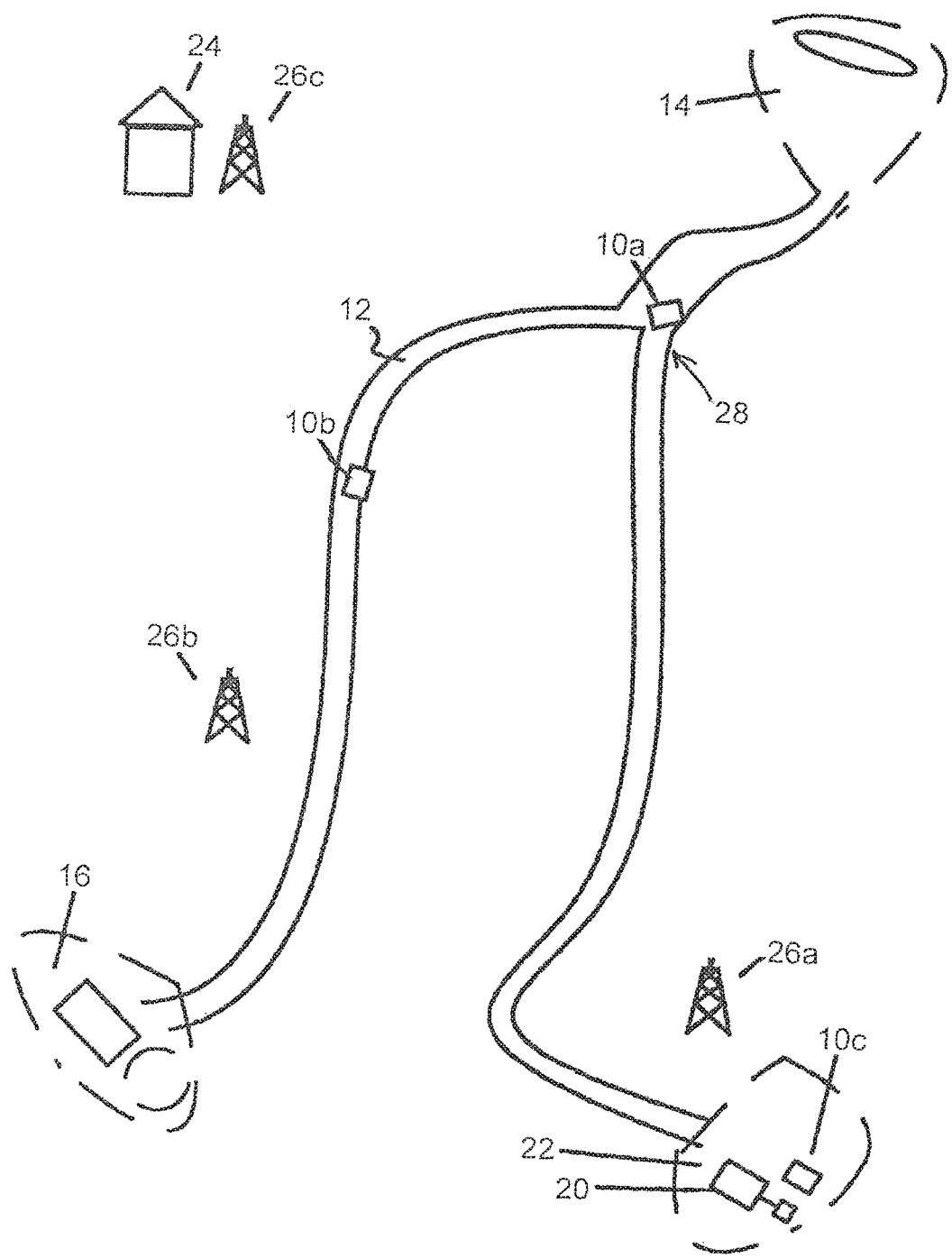
FIG. 1 is an illustration of a mining environment where systems and methods according to embodiments of the invention can be implemented.

The present system is configured for tire management within a mining environment. The present system is configured to dispatch vehicles within a mining environment in such a manner as to take the effect of operational decisions on tire conditioning into consideration. The present system is also configured to dispatch vehicles so that desired productivity levels are maintained. The present system is designed to potentially extend the operational lifetimes of tires, reduce mine expenses, and improve mine safety.

For the purpose of this disclosure, tire conditioning optimization refers to the application of systems and processes for extending the remaining useful lifetimes of tires while ensuring that mine productivity remains at desired levels. This generally involves the continual monitoring and assessment of tire health so that incipient failures may be identified prior to reaching critical states, thus potentially leading to more accurate planning for preventive maintenance services. It may also involve the implementation of production processes including vehicle dispatching routines that consider current and anticipated tire conditions.

With reference to mining haulage networks, mining vehicles, and mining operations, the systems and methods disclosed consider the following terminologies and principles.

Tire conditioning may refer to overall tire health as measured according to suitable metrics.

Within the context of this disclosure, the following are considered: the overall health of an individual tire, the overall collective health of all tires mounted on a vehicle, and the overall collective health of tire-bearing vehicles in a mine.

Tire conditioning can be affected by characteristics of the haul road network such as road conditions, terrain type, rolling resistance, elevation changes, and curvatures, as well as by environmental factors such as ambient temperature and weather conditions.

Tire conditioning can be affected by traffic rules and entities such as speed restrictions and intersections.

Tire conditioning can be affected by workload and maintenance histories.

A mining vehicle can have multiple tires (a typical haul truck has six tires, for instance). Each individual tire mounted on a vehicle is associated with its own tire conditioning state, workload history, and maintenance history.

The conditioning of a tire can be indicated by a set of attributes that includes, but is not limited to, parameters such as tire temperature, pressure, and tire wear. Some parameters can be directly measured via sensors or through manual inspection. Others are associated with accumulative measures as, for example, total mileage traveled or total hours in operation. For the purpose of this disclosure, a set of attributes are cited. It is clear that other attributes not explicitly identified or presented can be considered as input to the algorithms and systems presented herein. As well, for the purpose of this disclosure, we may refer interchangeably to tire conditioning parameters and tire conditioning vital signs.

Tire conditioning can be affected by vehicle operational activities and their intensities which are characterized by various measures such as empty and loaded travel times and distances.

Tire conditioning may be negatively affected when the vehicle is operated for periods during which tire conditioning parameters are outside of acceptable ranges. Acceptable ranges for tire conditioning parameters are indicated by manufacturer specifications or other expert systems.

Tire conditioning may be modeled using mechanical and physical principles (involving, for instance, friction, force, material properties, and resistance). Tire conditioning may be modeled using post-hoc analysis of empirical tire conditioning sensor data. It may be modeled using other data such as data on weather conditions, operational activities, and maintenance activities. In general, tire conditioning may be modeled with fundamental models, empirical models, and combinations thereof.

In the context of this disclosure, tire condition modeling can refer to a representation arising from theoretical principles, quantitative analysis, operational data, empirical data, and known and accepted standards. Such representation enables real-time tire conditioning diagnosis and prognosis. That is, tire condition modeling can explain the condition of a tire and can provide a prediction of future tire condition. Predictions are possible over time horizons of various lengths (with quality and certainty generally likely diminishing with longer time windows). Tire condition modeling also enables predictions on the impact to tire conditioning of operational activities in general and of dispatching decisions in particular.

Tire condition modeling generally has multiple components. One fundamental component is the development of an impact to tire conditioning (ITC) function defined over the mine haul road network. This function provides relative severity values to the impact on tire conditioning of traversals over segments of the haul road network. The ITC function has different dimensions corresponding to different aspects of tire conditioning, such as impact on tire wear and impact on tire temperature. Using the ITC function, the effect of route assignments to tire conditioning can be evaluated with respect to the different dimensions.

The condition of a single tire can be measured by way of a variety of sensors. This is a common practice in mining. This is also a common practice outside of the mining industry such as, for example, the consumer vehicle market with many current model vehicles equipped with individual tire pressure sensors. The available mechanisms for sensing tire condition are assumed to be commonly understood. Of importance to this disclosure is the fact that tire condition can be assessed by such mechanisms. Tire condition can then be made known to the system responsible for making decisions on vehicle activities. This is made possible, for example, with the wireless transmittal of data using commonly understood methods. As such, decisions on what activities to assign for a vehicle can be informed by knowledge on actual tire conditions for the specific vehicle or those for a fleet of vehicles.

Whereas each vehicle has multiple tires, and each individual tire has its own specific tire condition, assignments can only be made for each individual vehicle. Therefore, mechanisms for assessing and representing the condition of the tire set (that is, all the tires that are mounted on the vehicle) may be provided. This assessment can be made according to the state of a single tire such as, for example, the tire assessed to be exhibiting the least favorable condition by some measure. The assessment can alternatively be made according to an averaging conditioning measure for all tires. In general, a composite vehicle tire condition may be created by combining condition values according to different dimensions for the vehicle tire set.

With reference to mining haulage networks, mining vehicles, and mining operations, the systems and methods may provide the following.

The determination and use of an impact to tire conditioning (ITC) function (which we also refer to as a tire cost function in this disclosure) that models the impact to tire conditioning of vehicle traversals on segments of the haul road network The determination of best routes, such as the least-cost routes, according to the ITC function, between locations in the haul road network The determination of a production plan that takes into account the ITC function. In one embodiment, the production plan indicates the amount of material transported between loading and unloading sites. It is important to note that there may be additional constraints to the production plan that may limit the ability to minimize associated ITC-related costs.

The development of a tire conditioning diagnostic and prognostic system that considers current vital signs, vital sign histories, operational histories, and other relevant information The generation of vehicle assignments and other operational decisions that take into account current tire conditions, tire conditioning diagnosis and prognosis, least-cost routes, production plans, and other relevant information The execution of appropriate operational measures in response to specific tire conditions In one embodiment, the system is implemented by a mine dispatch system. The dispatch system may be configured to dispatch vehicles (i.e., instruct haul trucks on routes to travel and tasks to undertake) in real time. Generally, the dispatch system is configured to optimize the productivity of the mine's vehicles according to certain target criteria. As such, the system attempts to maximize the amount of material hauled within constraints defined by production requirements and available resources.

The system may be configured to optimize a number of attributes of a vehicle's operations so as to reduce the impact of truck activity on tire conditioning while maintaining a desired productivity level. Generally, the present system is configured to optimize both the paths trucks (or any other vehicles) take through the mine environment, and the overall production plan for the mine (e.g., the tasks that the vehicles within the mine environment are assigned), and then generate corresponding real-time assignments to the vehicles.

FIG. 1 is an illustration of a mining environment where systems and methods according to embodiments of the invention can be implemented. In the environment of FIG. 1, a plurality of mine haul trucks 10a-c operate on a mine haul route network 12. Mine haul trucks 10a-c perform hauling tasks, for example, by moving material between a shovel 20 site 22, a crusher site 16, and a dump or stockpile site 14.

Each vehicle in the mine environment can be equipped with an array of navigation, communication, and data gathering equipment that assist the vehicle's operator. Each vehicle may be equipped with a mobile computing device, for example, a tablet personal computer, a personal digital assistant, or a mobile industrial computer with screen and operator interface for implementing the present system.

The various vehicles include sensors or receivers (e.g., Global Positioning System (GPS) receivers) that generate information about the time-varying position, orientation, and speed of the vehicles. The position and velocity sensors may receive data from a geolocation receiver that generates information about the time-varying position of the vehicles based upon transmissions from transmitters located terrestrially, within the mining environment. Gyroscopes or other inertial navigation systems can also be used to locate the vehicles (e.g., haul trucks) within the mine environment.

The mine can include a communications network allowing computer systems on each vehicle to communicate with one another as well as with a centralized dispatch or control system located at central site 24. The communications network is represented as a collection of wireless data transceivers (e.g., transceivers 26a, 26b, and 26c), such as would be suitable in implementing a WiFi, WiMax, GPRS, EDGE or equivalent wireless network. These network architecture examples are not limiting.

In general, the mine dispatch or fleet management system (e.g., implemented by computer systems at central site 24) assigns trucks to a certain destination and corresponding task, and may, in some cases, specify the route by which the truck should travel.

Truck drivers may try to increase their productivity or tons moved per hour by minimizing the travel time between destinations. This typically takes the form of traveling at the maximum speed possible, limited only by speed limits and other safety considerations as well as the truck's capabilities. This behavior, however, may cause unnecessary wear and tear on the truck's tires, which the present system attempts to minimize or, alternatively, keep to a desired wear rate. As such, in one implementation of the present system, the central dispatch system is configured to monitor a position and movement of a number of vehicles operating within the mining environment. By analyzing those movements and the vehicle's assigned tasks, and taking into consideration other constraints, as detailed below, the present dispatch system can identify optimized routes and assignments to achieve desired tire wear in the vehicles in view of existing productivity constraints. For example, the dispatch system may instruct vehicles to adopt different speed profiles, carry a modified load (i.e., either more or less materials), travel along a different route, or undertake a different task, which may include stopping for a period of time or traveling to a particular vehicle shop for the implementation of repairs or maintenance.

With reference to FIG. 1, the mine site includes a number of different roadways. Each roadway has a number of attributes that can affect tire wear as a vehicle proceeds along the roadway. Example attributes include the length of a road way, the speed limit along the road way, road conditions, tire rolling resistance, and the like. Network 12 may also include a number of intersections (e.g., intersection 28) and destination points (e.g., shovel site 22, crusher site 16, or dump or stockpile site 14).

The mine site also includes a number of resources (e.g., facilities) that may be utilized by particular vehicles in performing their assigned tasks. A given mining operation may have several loading and dumping locations connected by a road network. These resources have limited capacities and only a finite number of trucks can occupy and interact with the resource at a given time. Accordingly, a vehicle arriving at a fully occupied resource would be required to wait until the resource becomes available.

The present system provides for vehicle dispatch that is arranged to both target a desired productivity for vehicles operating within the mining environment while also optimizing fleet tire conditioning (leading to a reduction in occurrences of tire overheating, for instance).

Figure 2:
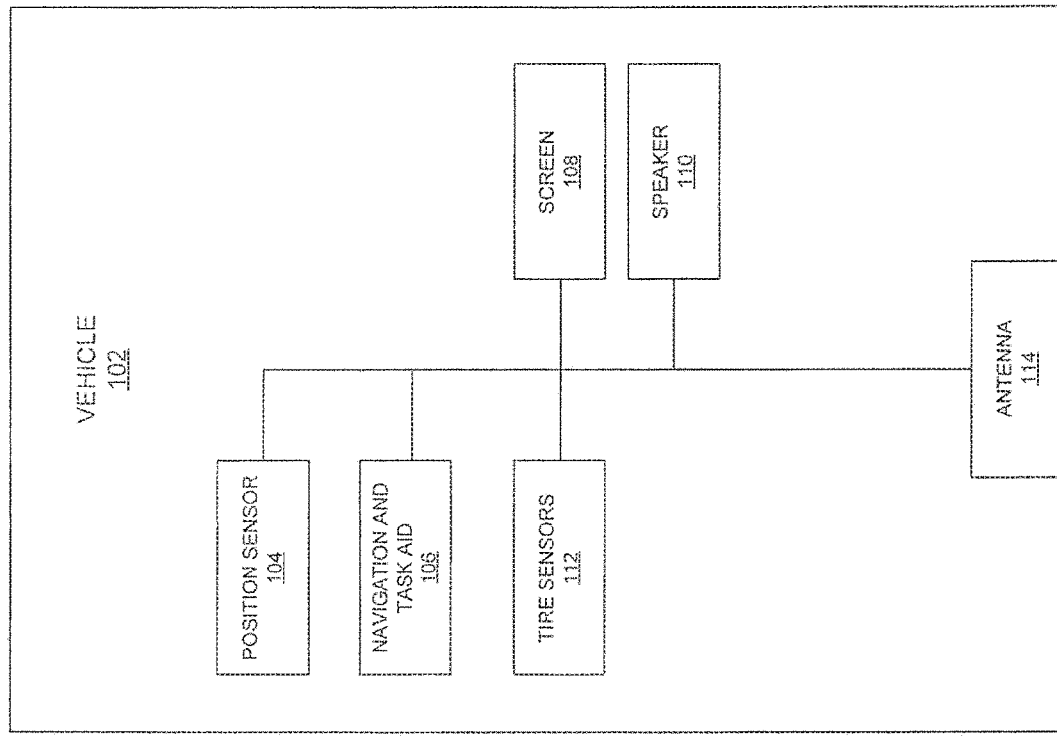
FIG. 2 is a diagram illustrating functional components of the present system for providing vehicle dispatch with improved tire wear characteristics.
Figure 2:
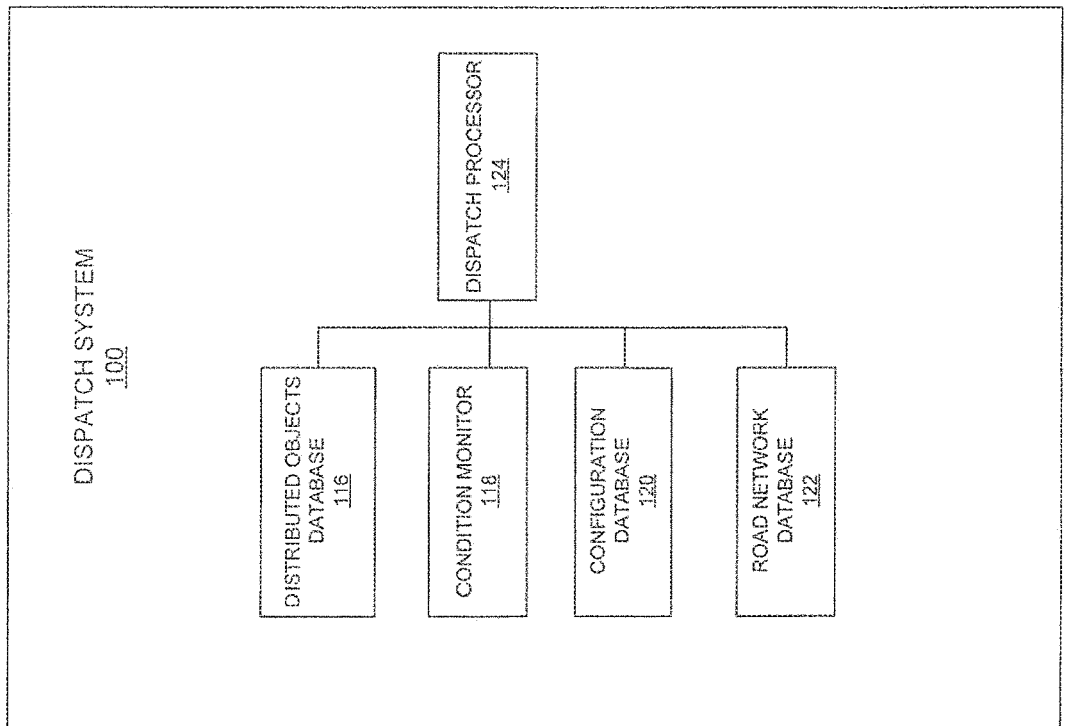

FIG. 2 is a diagram illustrating functional components of the present system for providing vehicle dispatch with improved tire wear characteristics. The system includes a number of sensors, databases (either locally accessible or accessed via a wireless or wired electronic communications network), and processing elements. The system is configured to gather information describing the activities of a number of vehicles within a mining environment and to generate dispatch instructions for the vehicles in a manner so as to optimize the tire conditions of the vehicles while achieving desired productivity goals and mitigating potential tire overheating conditions.

One or more components of the system can be mounted within a vehicle or truck 102 (although FIG. 2 only shows a single vehicle 102, it is to be understood that the present system is to be utilized in a mining environment having a plurality of vehicles 102). In various implementations, one or more components of the system, such as the various databases, may be installed at a central location of the mine where they may be updated and monitored by a centralized dispatch computing system 100. Generally, the components of the system shown in FIG. 2 may be installed directly into the vehicle 102 and in direct communication with one another or, if configured at a location away from the vehicle 102, the components are in wireless communication with the vehicle 102 and components mounted therein. In other implementations, to provide redundancy, one or more of the systems illustrated in FIG. 2 may be duplicated in both the vehicle 102 and an off-site location, for example, dispatch system 100. Accordingly, the distribution of components in FIG. 2 between dispatch system 100 and 102 is only illustrative, as the various components may be duplicated in both dispatch system 100 and vehicle 102, or located in one or the other of dispatch system 100 and vehicle 102.

In FIG. 2, system vehicle 102 includes a position sensor 104. Position sensor 104 detects the position of the vehicle, for example, by triangulating the vehicle 102's position in relation to fixed satellites, such as is known in GPS related art. Position sensor 104 might also determine the position of vehicle 102 by other means such as by triangulating the position in relation to terrestrial transmitters located in a mining environment. In certain embodiments, WiFi or WiMax network transceivers with fixed, known positions may be used to provide terrestrial points of reference. Position sensor 104 optionally can use a combination of methods or systems to determine position, for example, by determining a rough position using GPS and performing error correction by terrestrial references, such as broadcasting beacons mounted in and around the mining environment or other terrestrial reference points. In alternative embodiments, position sensor 104 also takes data from conventional RFID, RADAR, optical or other proximity or collision warning systems. These conventional systems can provide a warning signal to the vehicle operator and/or the operator of equipment in proximity to vehicle 102 if a piece of equipment such as a mine haul truck comes within some predefined range of another piece of equipment. Position sensor 104 also includes one or more systems for determining an orientation of the vehicle. In some cases, orientation may be determined by an electronically-readable compass or other systems that uses the earth's magnetic poles to determine orientation. In other cases, the vehicle's orientation may be sensed using one or more terrestrial beacons or devices mounted in and around the mining environment. In other cases, the vehicle's orientation can be determined algorithmically, for example by tracking a movement of the vehicle over time, and position sensor 104 can make an accurate determination of the vehicle's orientation.

In other implementations, position sensor 104 is assisted by a number of external devices that are mounted around various objects in the mining environment to assist in determining a location and an orientation of the vehicle. For example, a number of radar, LIDAR, laser, or other object-detection systems could be installed at the entrance to a crusher bay or other equipment disposed around the mining environment. As a vehicle approaches the bay, object-detection systems can scan the entrance to the bay and communicate the results of their scan to vehicle 102. Vehicle 102 can then use the information received from the externally-mounted object-detection systems to supplement the information retrieved from position sensor 104 to generate a more accurate description of the vehicle's current position and orientation.

Vehicle 102 also includes navigation and task aid 106 that is configured to assist an operator of vehicle 102 to navigate to a particular target destination and provide guidance on what task to undertake. To begin a task, the operator of vehicle 102 accesses navigation and task aid 106. Navigation and task aid 106 displays a task listing via a suitable user interface, such as screen 108. The task listing will identify the task assigned to vehicle 102 by dispatch system 100, which will include a destination and route to get to the destination and an activity assignment. For example, if dispatch system 100 assigns vehicle 102 the task of hauling material, the task listing may identify a location at which vehicle 102 is to collect material, a location for dumping the material, a route both to the material collection and from there to the dump site (which may include speed profiles or maximum allowable speeds along the route), as well as an indication of how much material vehicle 102 is to collect.

A user interface (e.g., a touch screen, keyboard, voice input, or other user input system) allows an operator of vehicle 102 to acknowledge the task or, if multiple candidate tasks are provided, select one of the candidate tasks. After a particular task is selected, navigation and task aid 106 uses position sensor 104 to display the specific route to the target destination. In one implementation, navigation and task aid 106 uses screen 108 to display a roadmap illustrating the area in proximity to the vehicle to assist the operator of vehicle 102 in performing the assigned task.

Vehicle 102 may further provide a user messaging function to alert the vehicle 102 operator of messages, such as instant messages or electronic mail, relayed to vehicle 102 from dispatch system 100. When a user receives a message, audible alarms can be sent to speaker 110 and visual alarms as well as a display of the message itself can be sent to screen 108. Vehicle 102 may also optionally include a data storage module that is updated by dispatch system 100. For example, vehicle 102 may include a database or other data storage system that stores roadmap data, overhead imaging data, or time varying data on a remote vehicle's position and/or condition. The database can be periodically updated by the central application (not shown), through a data synchronizer.

Vehicle 102 includes tire sensors 112 configured to monitor the pressure and temperature of the tires of vehicle 102. Such sensors are commercially available and may be of a standard type of functionality. Vendor specifications generally indicate acceptable ranges for tire pressure and temperature.

Vehicle 102 also includes antenna 114 enabling the various components of vehicle 102 to communicate with dispatch system 100 (e.g., via navigation and task aid 106).

The various systems and components of vehicle 102 along with any necessary data storage and communications hardware can be included in a variety of known devices, for example, handheld personal data assistants (PDAs), "smart" cellular telephones, and industrial rugged computers.

Dispatch system 100 includes a number of databases storing information useful in providing the functionality of the present disclosure. Distributed objects database 116 stores a listing of objects that are present within the mining environment. Distributed objects database 116 can store listings of candidate target destinations (where each object in the database may be a target), the position of vehicles and hazards or boundaries within the mining environment. Additional objects stored in distributed objects database 116 can include parking areas, repair facilities, buildings or structures, dumping areas, or power lines.

For each object, distributed objects database 116 can store, in addition to the location information for each object, additional descriptive information that identifies characteristics of the object. For example, in the case of vehicles, the database can store information describing the type of vehicle, its size and capacity, its current status (e.g., loaded or unloaded, in use or not in use, etc.), weight, and velocity. For each vehicle, distributed objects database 116 may also store information describing the operator of the vehicle (e.g., the operator's experience level, current assignment, shift status, etc.).

In some cases, the objects defined within distributed objects database 116 change over time. Because the mining environment is constantly being modified by the mining operations, nearly all objects within distributed objects database 116 can change over time. Accordingly, to ensure that database 116 contains up-to-date information, the contents may be periodically refreshed via a connection to a central computer system that monitors the position and status of objects within the mining environment. Accordingly, whether distributed objects database 116 is based in vehicle 102, dispatch system 100, or a combination of both, distributed objects database 116 is configured to be constantly and routinely updated. Updates to distributed objects database 116 are distributed efficiently and the database reflects the known objects within the mining environment at any point in time.

Dispatch system 100 also includes vehicle condition monitor 118. Vehicle condition monitor 118 is configured to monitor one or more systems within the vehicle 102 and to determine a current status or condition of those systems. In some cases, vehicle condition monitor 118 communicates with one or more vehicle sensors mounted in and around vehicle 102 to determine the current status of those systems. For example, vehicle condition monitor 118 may monitor a current status of the vehicle's fuel level, wheel positions (e.g., in two-wheel or four-wheel configurations, the angles of the wheels can be measured), current selected gear (e.g., forward or backward gears), braking status, etc. Vehicle condition monitor 118 can also determine whether the vehicle is carrying a load or whether the vehicle is empty. Vehicle condition monitor 118 can also monitor tire pressure and temperature by communicating with tire sensors 112 of vehicle 102.

Dispatch system 100 also includes configuration database 120. Configuration database 120 stores information describing certain vehicle attributes or conditions (including those related to tires) that are to be met before the vehicle can undertake a particular task.

Dispatch system 100 includes road network database 122. Road network database 122 stores information describing the location and route of the roadways in the mining environment. The database 122 may store additional information describing the roadway network such as intersection locations and types (e.g., four-way stop, two-way stop, and the like), roadway slopes, speed limits, and direction restrictions. Road network database 122 also stores a cost value with each segment of the road network, where the cost value reflects the impact on tire wear of traversal over the segment.

Dispatch system 100 includes dispatch processor 124. Dispatch processor 124 is configured to analyze data collected and stored in each of distributed objects database 116, condition monitor 118, configuration database 120, road network database 122, and, optionally, sensors on vehicle 102 to determine an optimized task allocation to vehicle 102 configured to optimize tire conditioning for vehicle 102.

As described above, dispatch system 100 is configured to determine the best paths for vehicles to take through the mine environment between particular locations, as well as an overall production plan for the mine that is designed to optimize for both productivity and tire wear for the vehicle in the mine environment. With the production plan determined, the dispatch system 100 can then generate real-time assignments to the vehicles that are optimized in view of the overall production plan for the mine.

Best Path Module

Dispatch processor 124 is configured to implement a best path procedure. The best path procedure is configured to determine the best path for vehicle 102 to take from one location to another while minimizing tire wear and tear.

Figure 3:
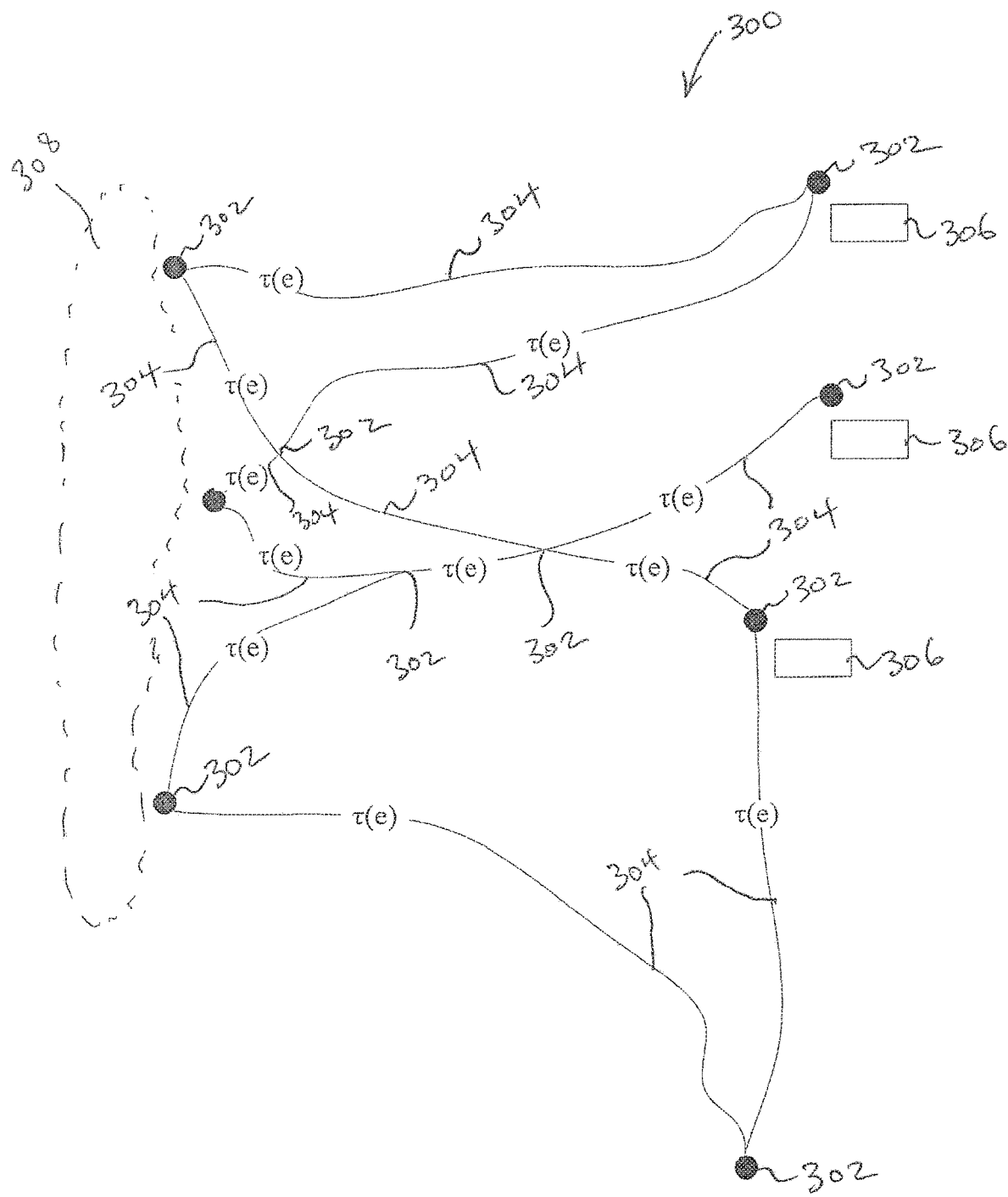
FIG. 3 depicts an example mining roadway network that includes a number of roadway edges, each edge being associated with an impact on tire conditioning value.

Within road network database 122, the mining roadway network is represented as a mathematical network that includes a number of nodes and edges. FIG. 3 depicts an example mining roadway network 300. A node 302 represents a location, such as a loading area (e.g., see area 308), a dumping area (e.g., see area 306), or a callpoint location or an intersection. An edge 304 represents a road segment and direction of travel. A path or segment from one node 302 to another generally includes a sequence of edges 304 connecting the nodes 302, such that the terminal node 302 of an edge 304 is the source node 302 of the succeeding edge 304.

If a positive cost value is associated with each edge 304, then it is possible to identify a path of least cost from one node 302 to another within the mining environment.

In calculating the best path between nodes 302, the cost allocated to each edge 304 along the best path may refer to any metric. In dispatch system 100, therefore, least-cost paths can be determined where the cost associated with each edge quantifies an impact on tire conditioning (ITC) of travel on the road network on any dimension for which ITC can be calculated.

As illustrated by FIG. 3, each edge 304 in roadway network 300 is associated with an ITC cost $\tau(e)$, where e denotes an edge 304. The ITC cost for each edge 304 is a function that indicates, for example, the amount of tire wear and tear, or the amount of energy absorbed in the tires (resulting in tire temperature changes) for a vehicle traversing the edge 304. The function may be dependent upon a number of factors including vehicle weight, speed, ambient temperature, and the like, as well as attributes of the roadway, such as surface type, gradient, curvature, and the like.

Given some haul road configurations, in some cases the ITC least-cost paths may be the same as the shortest paths and/or the paths with the smallest travel times. In any case, the ITC values associated with each edge 304 in the roadway network 300 allows for the assessment of paths between nodes 302 with respect to tire management. These assessments may then be associated with decision variables in the dispatch processor 124 to assist in developing an overall production plan for the mine, as described below.

The derivation of an ITC function can result from a process involving a study of the haul road network, analysis relating road segment attributes to archived outputs from tire monitoring systems, consultations with mine management, review of guidelines from manufacturers, and review of relevant literature.

Production Plan Module

A dispatching system generally works with a production plan that functions as a guide for the generation of actual truck assignments. In general, there is flexibility in determining the structure and level of detail (initial routing and timetabling of truck assignments, scheduling of resource allocations, the use of dispatching time windows, etc.) in production plans.

In one embodiment, having identified best paths (i.e., least-cost paths) between nodes 302 in the roadway network 300, dispatch system 100 is configured to generate an optimized production plan for the mine that sets forth desired material flow rates along the various paths between the nodes 302 in the roadway network 300.

In conventional mine production plans, these materials flow rates are selected with the sole aim of maximizing productivity within the mining environment. In the present dispatch system 100, however, the production plan is selected to both satisfy desired production requirements, while also optimizing tire usage of trucks within the mining environment.

As an illustration, Table 1, below, shows a sample production plan for a mine. The production plan defines a number of paths between nodes in the roadway network for the mine.

Along each path, the production plan specifies desired or target material flow rates.

TABLE 1

| Path | Source | Destination | Material Flow |
| --- | --- | --- | --- |
| Path 1 | Mine Face A | Dump Site 1 | 3,000 tons/hour |
| Path 2 | Mine Face A | Dump Site 2 | 1,750 tons/hour |
| Path 3 | Mine Face B | Dump Site 3 | 1,000 tons/hour |
| Path 4 | Mine Face C | Dump Site 3 | 1000 tons/hour |
| Path 5 | Mine Face C | Dump Site 4 | 4000 tons/hour |

When generating a production plan, the dispatch system 100 implements a model that includes the material flow rates on the haul road network 300 as its decision variables. In one embodiment, the model can be of the following form:

$$(P){:}\max\{f(x)=c^T x{:} Hx=b, x\geq 0\}.$$

$x=(x_r)_{r \in R}$, where R denotes a set of routes, and $x_r$ is the material flow rate associated with route $r \in R$. In this example, a route is a modeling construct and is associated with a number of attributes. The attributes of a route include a defined loading area and a dumping area (e.g., two nodes 302 selected from the mining roadway network 300), a corresponding path between the loading area and the dumping area, a material grade record, and a vehicle type. $c=(c_r)_{r \in R}$, where $c_r$ represents a productivity value per unit of material flow on route r.

Within the model (P), $f(x)=c^T x=\Sigma_{r \in R}(c_r x_r)$ represents a productivity measure associated with a production plan given by x. The constraint set is given by Hx=b, where H is a matrix, and b is a real-valued vector. Hx=b is a set of equations representing modeling and operating conditions that may be defined, for example, within distributed objects database 116. The constraints reflect, among others, shovel production rates, processing capacities at dump sites, and truck availability. For example, constraints may indicate that a particular shovel is only able to generate a certain amount of material over a given time frame, a crusher is only able to process a certain number of tons of material over a given time frame, or that the mine is operating with a specific number of trucks of a particular fleet type.

In the present system, E denotes the set of edges 304 in the road network 300. $\tau(e)$ denotes the ITC value for edge $e \in E$. In this arrangement, the statement that $\tau(e) > \tau(e')$ indicates that travel on edge e has a greater (or more severe) impact on tire conditioning than does travel of edge e'. Additionally, $\{\tau(e)\}_{e \in E}$ collectively provides a relative tire conditioning impact profile for the entire mine roadway network 300.

For a solution $x=(x_r)_{r \in R}$ of (P), $l(x_r)$ denotes the number of trips required to satisfy the flow rate value on route r. In one embodiment, $l(x_r)$ is linear in $x_r$ and is obtained by factoring in the payload value for the route vehicle type. The vehicle type for a particular route (as well as the capabilities and attributes of the vehicle) can be retrieved from distributed objects database 116, for example. Thus, for $r \in R$, $l(x_r)=l_r x_r$, for some constant $l_r \geq 0$. If E(r) represents the set of edges on the path corresponding to $r \in R$, it is then possible to then define an ITC load value, g(x), associated with the production plan, as follows:

$$g(x)=\Sigma_{r \in R}\Sigma_{e \in E(r)}\tau(e)l(x_r)=\Sigma_{r \in R}\{\Sigma_{e \in E(r)}\tau(e)l_r\}x_r.$$

With $d_r=\Sigma_{e \in E(r)}\tau(e)l_r$ for $r \in R$, the ITC load value equals $g(x)=\Sigma_{r \in R} d_r x_r$.

Consequently, tire management can be incorporated into the determination of a production plan upon identifying $x^*=(x_r^*)_{r \in R}$ that solves the following problem:

$$(Q){:}\{(\max f(x), \min g(x)) \text{ subject to } Hx=b, x\geq 0.$$

(Q) is a bi-objective optimization problem that seeks to maximize productivity and minimize the system-wide ITC load value associated with a production plan.

Scalar notions of optimality for single-objective problems do not generally apply to the multiobjective setting. Accordingly, solutions can be characterized according to concepts of efficiency and pareto-optimality. As such, one technique for handling multiobjective problems is the use of a weighted-sum objective. Thus, for example, instead of (Q), the production plan implemented by dispatch processor 124 may be expressed as the solution of a linear program of the form:

$$\max[\alpha f'(x) - \beta g'(x)] \text{ subject to } Hx=b, x\geq 0,$$

where $f'(x)$ is a (normalized) measure of productivity derived from $f(x)$, $g'(x)$ is a (normalized) measure of impact on tire conditioning derived from g(x), and $\alpha$ and $\beta$ are nonnegative constants with $\alpha+\beta=1$.

In other embodiments, alternative approaches for expressing the production plan include using one function (e.g., either $f(x)$ or $g(x)$) as the objective function and including a constraint that involves the other.

Control over material flow rate volumes may also be modeled at the constraint level. In the case that E' is a set of edges 304 that are associated with elevated ITC values, then material flow rates on routes containing those edges may be contained by maximizing $f(x)=c^T x$ subject to the constraints:

$$Hx=b, \Sigma\{x_r: E(r) \cap E' \neq \emptyset, r \in R\} \leq \gamma, x \geq 0,$$

where $\gamma$ is some positive constant. Such an implementation may involve or call for the identification of an appropriate $\gamma$ value.

In other embodiments, a production plan may be obtained with other modeling forms and techniques. For instance, optimization models allowing for the definition of nonlinear variables and objectives may be used. As well, multiple objectives may be established and considered in ways other than those discussed. In general, the construction of a mathematical programming model for the determination of a production plan involves the prescription of an objective function, a set of decision variables, and constraints (operational restrictions and requirements) defining a set of feasible solutions. Implementation issues as computational tractability and solution times factor. In another embodiment, the production plan is the result of specific scheduling and planning processes. Sophisticated production plans generally take into account issues of robustness in the face of operational changes. There is generally sufficient scope so that, for example, effect on tire impact allows for variability in desired and used travel routes. In the end, the plan is simply a recipe that states what and how production is planned to occur.

Generate Task Assignments for Vehicles in the Mining Environment

Actual truck assignments are generally made in accordance with a plan with allowances for levels of plan-adherence in view of actual operational conditions.

Figure 4:
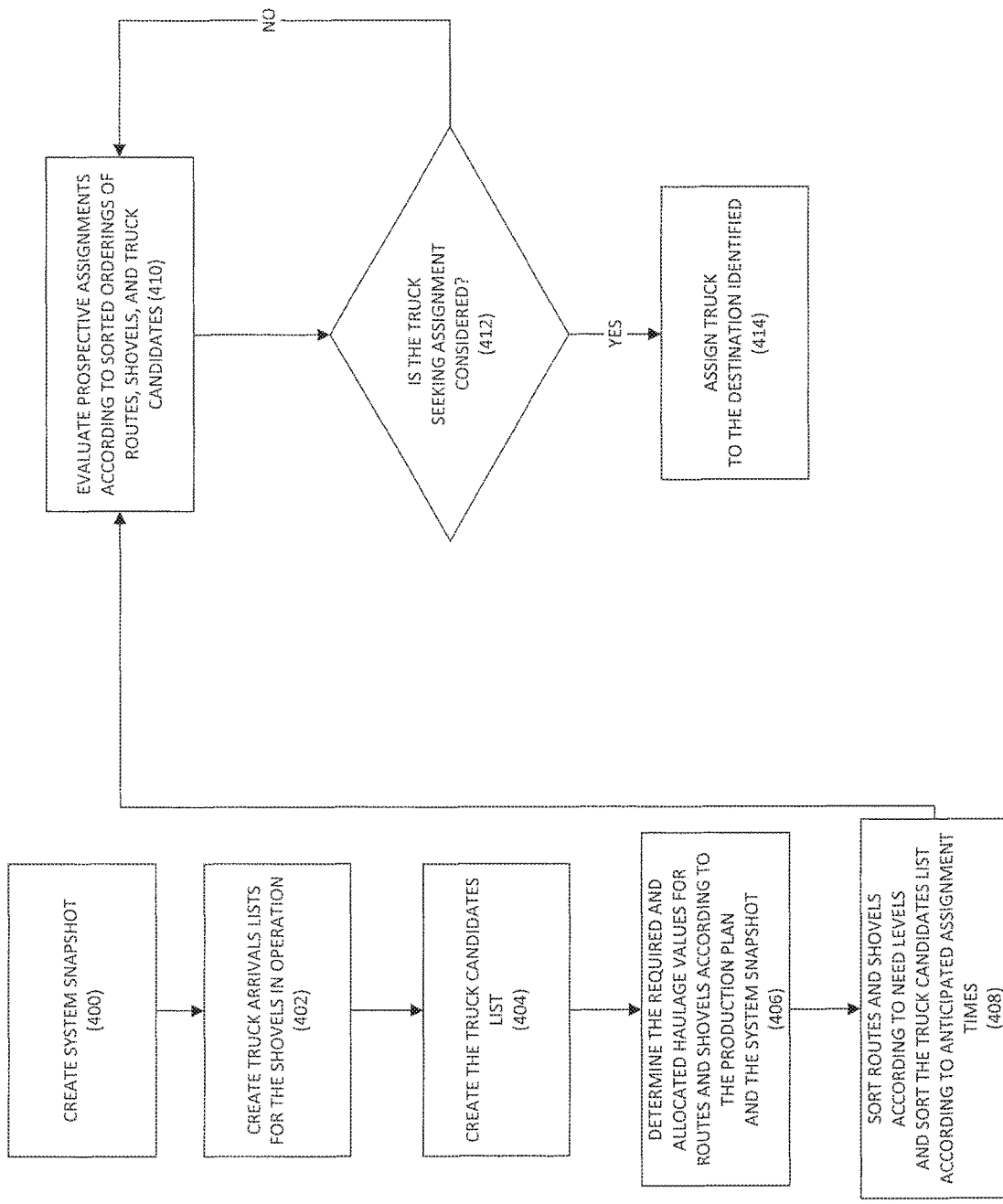
FIG. 4 is a flowchart depicting a method of assigning a task to a vehicle.

In one embodiment, after a mine production plan has been created as above, dispatch processor 124 implements task assignment procedures for a vehicle 102 in the mine environment. The task assignment procedures may be different depending upon whether a particular vehicle 102 is loaded or not. The procedures may be similar in design, however, so the following discussion focuses upon the empty vehicle 102 assignment procedure. The method for task assignment production is illustrated in the flowchart of FIG. 4.

Underlying the empty vehicle 102 assignment procedure are calculations of 1) required and allocated haulage values for routes and loading areas, and 2) penalty values for prospective assignments of trucks to loading areas. The required haulage values reflect truck resource amounts necessary to adhere to the production plan. The allocated values total the payloads of trucks that are at or en-route to loading areas within the mine environment. A route or loading area is said to be needy if the corresponding allocated value is less than that required pursuant to the production plan. Penalty values indicate shovel and truck idle times for prospective assignments. In general, absent operational restrictions, preference is made for assignments associated with least penalty values.

When a particular vehicle 102 requires a task assignment, two processes can be executed. First a system snapshot is created (see step 400) and prospective task assignments are evaluated. In that case, R' is the set of routes from dumping areas to loading areas with positive flow rate values in the mine's productivity solution, S is the set of shovel sites in operation, and T is the set of haul trucks in service. The terms "shovel sites" and "loading areas" can be used interchangeably.

The system snapshot can be created by creating and sorting various data lists (where the data may be captured, for example, from distributed objects database 116, condition monitor 118, and configuration database 120), as follows. Trucks that are at, en-route to, or are projected to be dispatched to, a shovel site, s E S, are placed in a truck arrivals list, $T_a(s)$ (step 402). Trucks that require or are expected to require in the near future assignments to shovel sites are placed in a general truck candidates list, T' (step 404). Trucks that can be dispatched to a particular shovel site, s∈S, are placed in a truck candidates list, $T_c(s)$. $T_c(s)$ is contained in T'. The required and allocated haulage values for empty routes (originating at dumping areas and terminating at loading areas) e∈R' and shovel sites s∈S are determined (step 406). S and R' are sorted in decreasing order of need level values and T' is sorted according to the expected assignment times of the trucks (408).

In step 410, dispatch system 100 then performs evaluations of prospective assignments with the following sub-processes: (1) for a particular shovel site, a truck in the dispatch system's candidate truck list whose assignment to the shovel site is associated with a least penalty value (total shovel and truck idle times) is identified, and (2) for a particular truck, a shovel site that is associated with least penalty (total shovel and truck idle times) among those whose candidates lists include the truck, is identified. Trucks are evaluated according to the ordering in T'. When trucks are "assigned", the haulage values and truck lists are updated accordingly. The evaluation process—and the task assignment procedure—terminates when a destination for the truck seeking assignment has been identified (steps 412 and 414).

In integrating tire management into the task assignment procedure, the following information can be used in addition to the production plan and normal mine operational information. Haul Road Data, in the form of an ITC profile of the roadway network 300 within the mining environment. Vehicle Work History, which represents work that has been assumed by a particular vehicle. Alternatively, the vehicle work history may be an indicator an amount of heat accumulation occurring within a vehicle's tires. Work undertaken by a vehicle can be described by historical task assignments for the vehicle, with such descriptors as load weights and the times and distances of completed haul cycles. Distributed objects database 116, for example, may store such information. Vehicle Maintenance History, which indicates tire-related services done for a particular vehicle. The information includes data on the severity of issues and the times and types of services received. Distributed objects database 116, for example, may store such information. Tire Conditioning Parameter Values Data, which may include current readings (e.g., captured from tire sensors 112 of vehicle 102) and historical data (e.g., retrieved from historical tire temperature and pressure data stored in distributed objects database 116) of parameters such as tire pressure and tire temperature A prognosis on whether the tire conditioning state of vehicle 102 is declining, improving, or unchanging may be derived from current output from tire monitoring systems and from recent historical data.

The current state and any prognosis on tire conditioning for vehicle 102 may be collectively expressed by a tire conditioning fitness level for vehicle 102. Table 2 below, illustrates some possible fitness levels and their descriptions.

Tire management recourse actions that may be prescribed include immediate work stoppage, speed restrictions, load de-rating (i.e., a reduction in the amount of material the truck is authorized to carry), and short haul assignments. Vehicles with favorable tire conditioning indicators may also be subject to recourse measures such as, for example, dispatching strategies that deter prolonged sequences of long hauls, as well as short hauls. This can be seen as a preventative measure against high rates of tire temperature increases. A recourse action may also be the immediate dispatching of a vehicle to a tire shop or the assignment to a tire shop factoring in shop workloads and capacities. In the present disclosure, a tire shop is considered any location at which a vehicle may receive service or assistance relating to one or more of the vehicle's tires. As such, the tire shop may be a location having a formal building and infrastructure for service the tires of vehicles. Alternatively, the tire shop may simply be a location at which the vehicle may be stored or otherwise retained in order to receive tire service. This could involve, for example, workers or other personal traveling to the so-designated tire shop in order to work on the tires of a vehicle. As such, a tire shop may, in accordance with this disclosure, be no more than an area of land or a non-specific building or collection of buildings designated as a tire shop.

A set of example recourse actions is shown below in Table 3.

A tire conditioning recourse regime is defined as a combination of recourse actions which may be in effect for a vehicle. A set of recourse regimes is shown in Table 4. For example, with reference to Table 4, a vehicle operating under regime 4 is to be assigned to short hauls and must slow down. A vehicle for which regime 11 is in effect has a break or service scheduled and is, until then, being loaded at less than its payload capacity. In the course of a shift, a vehicle may transition between regimes. As well, at any time, there exists a partitioning of the fleet of vehicles with respect to the regimes.

TABLE 2

| Fitness Level | Description |
|---|---|
| Undetermined | Information is lacking on tire conditioning. |
| Good | Vital signs are stable and within normal limits. Indicators are excellent. No operating restrictions. |
| Fair | Vital signs are stable and within normal limits. Indicators are favorable. |
| Guarded | Vital signs are stable but close to threshold values. Indicators are questionable. Vehicle should be operated with caution. |
| Serious | Vital signs are unstable and not within normal limits. Indicators are questionable. |
| Critical | Vehicle should be operated with elevated caution. An equipment maintenance technician should be consulted. A work break for the vehicle should be scheduled. Vital signs are unstable and not within normal limits. Indicators are unfavorable. Vehicle should stop at the first possible and safe opportunity. |

TABLE 3

| Recourse Action | Description |
|---|---|
| None | No recourse action in effect |
| Mixed Hauls | Truck assignments should combine short and long hauls |
| Short Hauls | Truck is to be assigned to short hauls |
| Slowdown | Truck speed is restricted |
| Load De-rating | Truck load is less than the payload capacity |
| Break/Service Scheduled | A break/service has been scheduled for the truck |
| Immediate Stoppage | Truck should stop and park at the first possible opportunity |

TABLE 4

| Recourse Action | Regime | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| None | X | | | | | | | | | | | |
| Mixed Hauls | | X | | | | | | | | | | |
| Short Hauls | | | X | X | X | X | X | | | | | |
| Slowdown | | | | X | | X | | X | X | | | |
| Load De-rating | | | | | X | | X | | | X | X | |
| Break Scheduled | | | | | | X | X | | | X | | X |
| Immediate Stoppage | | | | | | | | | | | | X |

Figure 5:
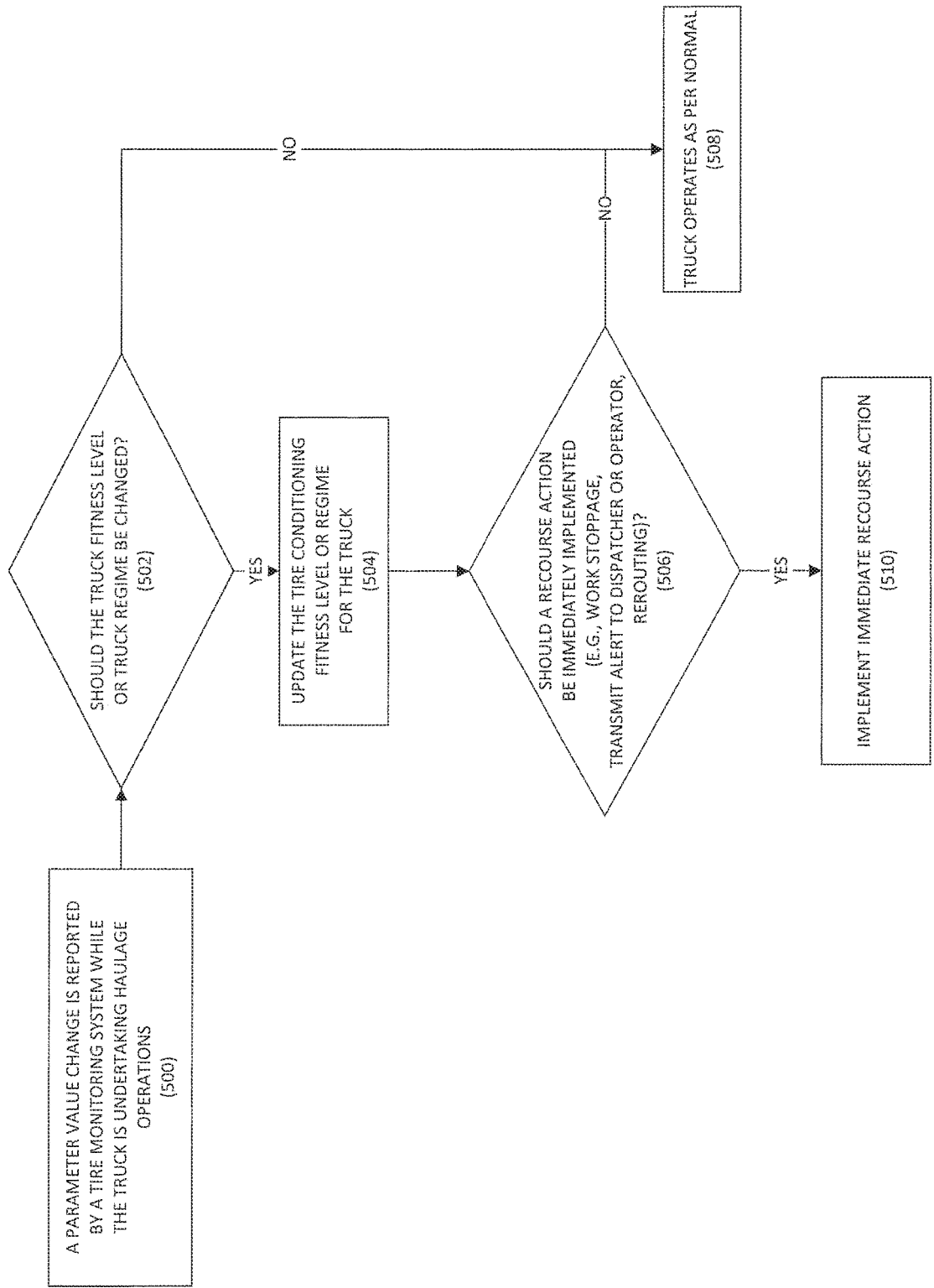
FIG. 5 is a flowchart depicting a method of updating instances of a tire conditioning fitness level and recourse regime for a vehicle.

In general, the tire conditioning for a vehicle would be set to a good level or a fair level upon completion of a tire service. In general, as well, a vehicle undertaking operational activities may have its fitness level and recourse regime modified at any time, as when the monitoring system for any one tire reports a parameter value change. For example, FIG. 5 is a flowchart depicting a method of updating instances of a tire conditioning fitness level and recourse regime for a vehicle. In various embodiments, the method may be performed by a vehicle dispatch system as described herein. Referring to FIG. 5, in step 500, a tire monitoring system reports a change in a parameter value for a vehicle that is currently undertaking haulage operations. In step 502, after the change in parameter value is detected, a determination is made as to whether the vehicle's fitness level or regime should be changed. In not, the vehicle continues operating normally (step 508). If so, in step 504 the tire conditioning fitness level or regime for the vehicle is updated and then in step 506, a determination is made as to whether a recourse action is required to be immediately implemented. If not, again, in step 508 the vehicle continues operating normally. If so, in step 510 the immediate recourse action is implemented.

In a specific implementation, the vehicle dispatch system may define various different tire alarm events. These may be associated with a tire pressure reading (e.g., from a suitably-configured tire pressure sensor) that exceeds or falls below a particular threshold or a tire temperature reading that similarly falls above or below particular threshold values. For example, different tire pressure thresholds could be associated with a Low Pressure threshold, a Very Low Pressure threshold, a Pressure Low Min threshold, a High Pressure threshold, a Very High Pressure threshold, and a Pressure High Max threshold. If the dispatch system determines that a tire pressure reading for a tire of a particular vehicle has exceeded (or fallen below) one of those predetermined thresholds, the dispatch system may undertake a tire control action, described below. Additional sensor readings that may be utilized by the dispatch system to determine whether to implement a particular tire control action may include temperature readings. In that case, the dispatch system may compare a current tire temperature reading to thresholds such as a High Temperature threshold or a Temperature High Max threshold. If a temperature threshold is exceeded, the dispatch system may undertake an appropriate tire control action.

The dispatch system may constantly or routinely compare sensor readings for the tires of a particular vehicle to the thresholds described above. If a particular threshold is exceeded (or fallen below), that exception may result in the dispatch system assigning the vehicle a particular tire control action. The assignment of a particular tire control action may involve, for example, communicating the tire control action to a navigation aid and task aid in the vehicle (e.g., navigation aid and task aid 106 of FIG. 2), where the tire control action can be display for the vehicle operator. The vehicle operator can then review the tire control action and operate the vehicle accordingly. As such, the tire control action may simply be reflected in the task that is currently assigned to the vehicle. In the case of an autonomous vehicle, the dispatch system may communicate the tire control action to the autonomous controller of the vehicle, which can then take appropriate action.

Figure 7:
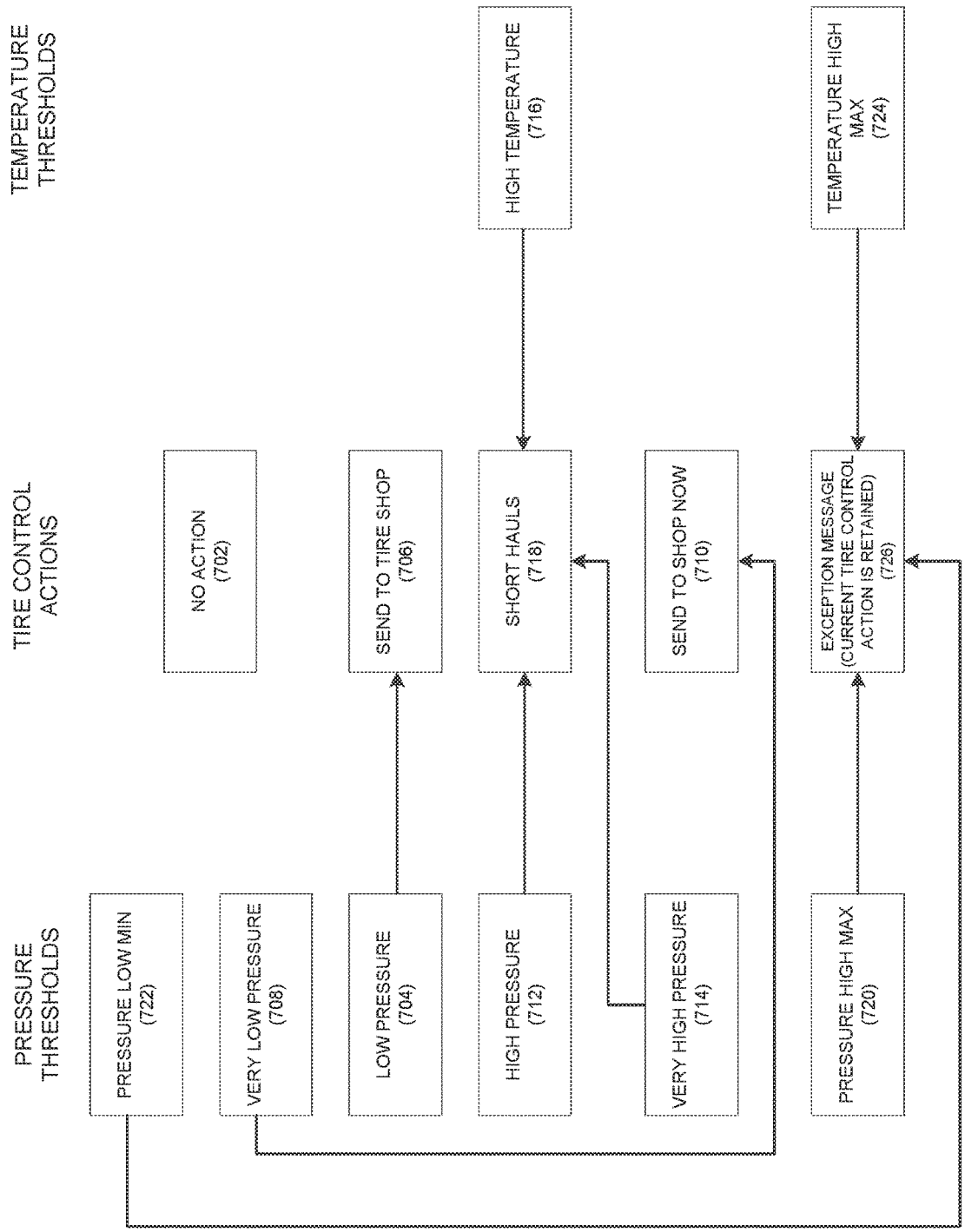
FIG. 7 is a block diagram illustrating how particular tire pressure or temperature readings can result in the dispatch system implementing particular tire control actions.

FIG. 7 is a block diagram illustrating how particular tire pressure or temperature readings can result in the dispatch system implementing particular tire control actions. In FIG. 7, blocks 722, 708, 704, 712, 714, and 720 on the left side of the figure represent different tire pressure thresholds, with the thresholds increasing from top to bottom. Blocks 702, 706, 718, 710, and 726 in the center of the figure represent different tire control actions that may be implemented by the dispatch system. Blocks 716 and 724 on the right side of the figure represent different tire temperature thresholds, with the thresholds increasing from top to bottom.

In a first case, if no thresholds have been exceed (e.g., if the pressures of all tires on a vehicle have a normal reading and the tire pressure reading does not fall below the low pressure threshold (block 704) and does not fall above the high pressure threshold (block 712)) and the tire temperatures are below the High Temperature threshold, the dispatch system may allocate the vehicle no tire control action (block 702). In that case, the dispatch system may make task assignment (e.g., routing) decisions for the vehicle according to regular dispatching procedures.

In a second case, if the dispatch system determines that a tire pressure for a particular vehicle falls below a low pressure threshold (block 704), the dispatch system may assign that vehicle a tire control action of Send to Shop (block 706). In accordance with that tire control action, an empty vehicle with the Send To Tire Shop tire control action will be dispatched to a tire shop that the dispatch system determines is open, has available capacity, and is within a specified distance of the truck. For this Send to Shop tire control action the vehicle is allowed to complete the vehicle's current assignment (i.e., to dump the load it is currently carrying). At that time, the vehicle will be empty and will not have a current task assignment and the Send To Tire Shop tire control action will be implemented.

Generally, the Send To Tire Shop tire control action is executed if the vehicle (1) is seeking an assignment from an unloading site or (2) is headed towards a loading site and is registered to be at a reassignment callpoint location.

In a third case, if the dispatch system determines that a tire pressure for a particular vehicle falls below a very low pressure threshold (block 708), the dispatch system may assign that vehicle a tire control action of Send to Shop Now (block 710). In accordance with that tire control action, an empty vehicle with the Send To Tire Shop Now tire control action will be dispatched to a tire shop that the dispatch system determines is open if the vehicle (1) is seeking an assignment from an unloading site, (2) is headed towards a loading site and is registered to be at a reassignment callpoint location, or (3) has arrived at a loading site and has not commenced loading. In this case, the tire control action is effectively more urgent (as a result of the tire control action being triggered by the very low pressure threshold, which describes a lower temperature than the low temperature threshold) and, as a consequence, a vehicle with this tire control action will be sent to the shop even if the vehicle is currently undertaking a loading task (but has not been loaded yet). In some cases, the only restriction to immediately implementing a Send To Tire Shop Now control action may be that the vehicle is empty and not currently carrying a load. The dispatch system may determine whether the truck is empty by direct examination (e.g., by interrogating sensors that report a current weight of a load being carried by the vehicle), or by examining the prior work or task history of the vehicle. If the vehicle's most recent task called for the vehicle to dump a load, and the vehicle has not yet undertaken another task that would cause the vehicle to be loaded, the dispatch control system can assume that the truck is empty for purposes of imposing the Send To Tire Shop Now control action.

In alternative embodiments, the Send To Tire Shop Now tire control action may result in the vehicle immediately stopping whatever task the vehicle was currently undertaking and proceeding directly to the nearest available tire shop (with no consideration of whether the vehicle is currently carrying a load). In some cases, however, this can result in overcrowding at a particular tire shop. Accordingly, the dispatch system may be configured to allow vehicles assigned the Send To Tire Shop Now tire control action that are loaded to dump their loads before being assigned to the nearest open tire shop.

In a fourth case, if the dispatch system determines that a tire pressure for a particular vehicle falls above a high pressure threshold (block 712) or a very high pressure threshold (block 714) or a tire temperature for a particular vehicle falls above a high temperature threshold (block 716), the dispatch system may assign that vehicle a tire control action of Short Hauls (block 718). In accordance with that tire control action, the vehicle will preferentially be assigned shorter haul task assignments by the dispatch system (e.g., task assignments that involve traveling along routes that are less than a threshold distance). Generally, the dispatch system issues truck assignments that adhere as much as possible to the solution of an optimization model that is formulated and solved periodically within the dispatch system. The solution, which serves as a production plan, is provided as a set of material flow rates. Accordingly, loaded (shovel sites to unloading sites) and unloaded (unloading sites to shovel sites) routes with the mine environment may be identified. For the Short Hauls tire control action, a set of penalized shovels is identified with respect to the mine's solution and the value of a Short Haul configuration parameter (SH_PARAM). In executing the Short Haul tire control action, the value $\alpha$ may represent the SH_PARAM configuration value and have a numerical value between 0 and 100. A threshold distance $d_\alpha$ that is larger than approximately $\alpha$ % of the routes identified in the mine's identified loaded and unloaded routes is determined. The loaded or unloaded routes that do not exceed $d_\alpha$ are then said to be short and may be associated with a set of candidate short haul tasks. Moreover, a shovel whose minimum outgoing loaded distance exceeds the threshold value (so that all outgoing loaded routes are long) is said to be a penalized shovel. The Short Haul tire control action, when implemented by the dispatch system, disfavors assignments to penalized shovels.

In some embodiments, the duration of the dispatch system applying the Short Haul tire control action to a particular will be time limited (e.g., there will be a fixed duration to the Short Haul tire control action). After the Short Haul tire control action times out, the dispatch system may return the vehicle to normal task assignments (e.g., by setting the tire control action for the vehicle to a value of No Action).

In a fifth case, if the dispatch system determines that a tire pressure for a particular vehicle falls above a pressure high max threshold (block 720), which is greater than the very high pressure threshold (block 714), or the tire pressure falls below a pressure low min threshold (block 722), which is less than the very low pressure threshold (block 708), or a tire temperature for the vehicle is above the temperature high max threshold (block 724), which is above the high temperature threshold (block 716), such a condition could indicate an emergency event or a system malfunction. In that case, rather than assign a specific tire control action, the dispatch system generates an exception message (block 726) that may be displayed to an operator of the dispatch system so that the operator can undertake appropriate steps.

In various embodiments, for a given vehicle, after the vehicle visits a tire shop (presumably for appropriate repair), the tire control action for that particular vehicle will be reset to a value of No Action (block 702). Similarly, at the start of a shift for a particular vehicle, in some embodiments, the dispatch system will reset any active tire control actions for that vehicle to a value of No Action (block 702).

In the present system, it is also possible to integrate the recourse actions active for a truck at any particular time into the task assignment procedure described above.

For example, the membership of a particular truck in the truck candidates list, $T_c(s)$, for a particular shovel site s, can be influenced by whether the truck is being assigned to short hauls or alternately between short and long hauls. Alternatively, the membership of a particular truck in an arrivals list, $T_a(s)$, for a shovel site s, is at least partially determined by a predicted arrival time of the truck at the loading area. If a particular truck is operating under a slowdown recourse action, the predicted arrival time will be at least partially affected by the recourse action currently in effect for that particular truck. As another example, the calculation of allocated haulage values for routes and loading areas will reflect active load de-rating recourse actions. Preference or bias can be reflected in the calculation of penalty values.

Figure 6:
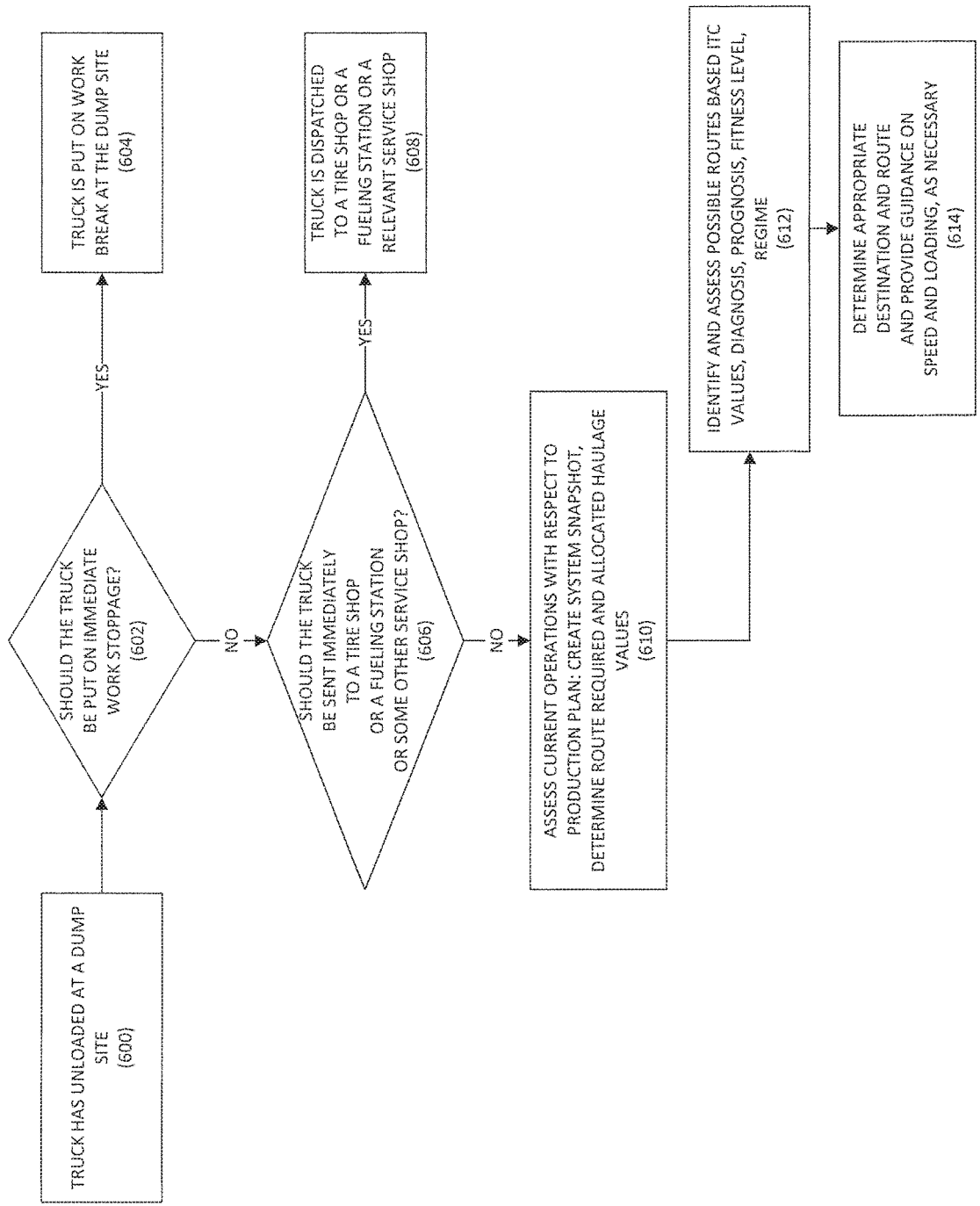
FIG. 6 is a flowchart depicting a method of assigning a task to a vehicle.

An example dispatching instance is outlined in the flowchart of FIG. 6. The method of FIG. 6 may, in various embodiments, be implemented by a vehicle dispatch system as described herein. In step 600, it is determined that a vehicle has unloaded at a dump site and, consequently, requires a dispatch assignment. In step 602 a determination is made as to whether the vehicle should be put on an immediate work stoppage. If so, in step 604 the vehicle is put on a break. If not, in step 606 a determination is made as to whether the vehicle should be sent to a service shop, such as a tire shop or fueling station. If so, in step 608 the vehicle is dispatched to the appropriate service shop. If not, in step 610 the current conditions of the vehicle are assessed with respect to the production plan. This may involve creating system snapshots, determining required routes to target destinations, and allocated haulage values. Then, in step 612 possible routes to the target destinations can be identified and assessed based on ITC values, diagnosis, prognosis, fitness level, and regime. Finally, in step 614 the appropriate destination and route can be identified and guidance can be provided to the vehicle operator regarding speed along the route and loading of the vehicle, as necessary.

Accordingly, when dispatching a vehicle, necessary or recommended recourse actions, such as work stoppage (steps 602, 604) or dispatching to a workshop (steps 606, 608) for tire servicing, fueling, or other functions can be immediately considered. If a vehicle is not dispatched to a workshop or similar location, dispatching decision-making processes with explicit tire conditioning considerations as described above (steps 610, 612) can be executed.

In accordance with the present disclosure a system includes a pressure sensor configured to measure a tire pressure of a tire of a vehicle, a navigation aid configured to output a task assignment for review by an operator of the vehicle, and a dispatch control system configured to receive an indication of the tire pressure of the tire of the vehicle from the pressure sensor, determine the task assignment based upon the indication of the tire pressure of the tire of the vehicle, and transmit the task assignment to the navigation aid for output by the operator of the vehicle.

In another embodiment, a dispatch control system includes a road network database storing a mining road network defining a plurality of edges in the mining road network, a distributed objects database, and a dispatch processor. The dispatch processor is configured to perform the steps of accessing the road network database to identify a tire cost for each of the plurality of edges in the mining road network, accessing the distributed objects database to identify constraints for nodes on the mining road network, and determining a production plan using the constraints for the nodes on the mining road network and the tire cost for each of the plurality of edges by, maximizing a function of the form $\alpha f'(x) - \beta g'(x)$, where $f'(x)$ is a normalized measure of productivity, $g'(x)$ is a normalized measure of impact on tire conditioning, and $\alpha$ and $\beta$ are nonnegative constants with $\alpha + \beta = 1$. The dispatch processor is configured to perform the steps of determining a task assignment for each haul truck the plurality of haul trucks using the production plan, and transmitting the task assignment of each haul truck in the plurality of haul trucks to each haul truck.

In another embodiment, a method includes receiving an indication of a tire pressure of a tire of a vehicle from a pressure sensor, determining a task assignment based upon the indication of the tire pressure of the tire of the vehicle, and transmitting the task assignment to a navigation aid of the vehicle for output to the operator of the vehicle.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for example, comprise one or more physical or logical blocks of computer instructions which may, for example, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, punch card, flash memory, integrated circuits, or other digital processing apparatus memory device.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Where, "data storage media," or "computer readable media" is used, Applicants mean an information storage medium in combination with the hardware, firmware, and/or software, needed to write information to, and read information from, that information storage medium. In certain embodiments, the information storage medium comprises a magnetic information storage medium, such as and without limitation, a magnetic disk, magnetic tape, and the like. In certain embodiments, the information storage medium comprises an optical information storage medium, such as and without limitation, a CD, DVD (Digital Versatile Disk), HD-DVD (High Definition DVD), BD (Blu-Ray Disk) and the like. In certain embodiments, the information storage medium comprises an electronic information storage medium, such as and without limitation, a PROM, EPROM, EEPROM, Flash PROM, compact flash, smart media, and the like. In certain embodiments, the information storage medium comprises a holographic information storage medium.

Reference is made throughout this specification to "signals." Signals can be any time varying electromagnetic waveform, whether or not encoded with recoverable information. Signals, within the scope of this specification, can be modulated, or not, according to any modulation or encoding scheme. Additionally, any Fourier component of a signal, or combination of Fourier components, should be considered itself a signal as that term is used throughout this specification.

While one or more embodiments of the present invention have been illustrated in detail, the skilled artisan will appreciate that modifications and adaptations to those embodiments may be made without departing from the scope of the present invention as set forth in the following claims.

We claim:

1. A dispatch control system, comprising:
a road network database storing a description of a mining road network, wherein the description of the mining road network defines a plurality of edges in the mining road network;
a distributed objects database; and
a dispatch processor configured to perform the steps of:
accessing the road network database to identify a tire cost for each of the plurality of edges in the mining road network,
accessing the distributed objects database to identify constraints for nodes on the mining road network,
determining a production plan using the constraints for the nodes on the mining road network and the tire cost for each of the plurality of edges by, maximizing a function of the form $\alpha f'(x) - \beta g'(x)$, where $f'(x)$ is a normalized measure of productivity, $g'(x)$ is a normalized measure of impact on tire conditioning, and $\alpha$ and $\beta$ are nonnegative constants with $\alpha + \beta = 1$;
determining a task assignment for each haul truck the plurality of haul trucks using the production plan; and
transmitting the task assignment of each haul truck in the plurality of haul trucks to each haul truck.

2. The dispatch control system of claim 1, wherein the dispatch processor is configured to, for a first haul truck in the plurality of haul trucks, perform the steps of:
determining at least one of a current tire temperature and a current tire pressure;
determining a history of at least one of tire temperature and tire pressure for the first haul truck;
determining a history of at least one of a work load history and a maintenance history for the first haul truck; and
determining a prognosis for the first haul truck using the at least one of the current tire temperature and the current tire pressure, and the history of at least one of the work load history and the maintenance history for the first haul truck.

3. The dispatch control system of claim 2, wherein the dispatch processor is configured to perform the step of modifying an operating regime of at least one of the plurality of haul trucks based upon the prognosis.

4. The dispatch control system of claim 3, wherein modifying the operating regime includes restricting a maximum speed of at least one of the plurality of haul trucks, or restricting a maximum payload of at least one of the plurality of haul trucks, or dispatching for servicing at least one of the plurality of haul trucks.

5. The dispatch control system of claim 2, wherein determining the task assignment includes:
identifying a candidate task for at least one of the plurality of haul trucks;
identifying a route through the mining road network associated with the candidate task; and
determining a tire cost associated with the route through the mining road network.

6. The dispatch control system of claim 1, wherein the tire costs for the plurality of edges in the mining road network are determined by a surface type, rolling resistance, gradient, or curvature of at least one of the plurality of edges in the mining road network.

7. A method, comprising:

accessing a road network database storing a description of a mining road network, wherein the description of the mining road network defines a plurality of edges in the mining road network, to identify a tire cost for each of the plurality of edges in the mining road network, accessing a distributed objects database to identify constraints for nodes on the mining road network, determining a production plan using the constraints for the nodes on the mining road network and the tire cost for each of the plurality of edges by, maximizing a function of the form $\alpha f'(x) - \beta g'(x)$, where $f'(x)$ is a normalized measure of productivity, $g'(x)$ is a normalized measure of impact on tire conditioning, and $\alpha$ and $\beta$ are nonnegative constants with $\alpha+\beta=1$;

determining a task assignment for each haul truck the plurality of haul trucks using the production plan; and transmitting the task assignment of each haul truck in the plurality of haul trucks to each haul truck.

8. The method of claim 7, further comprising, for a first haul truck in the plurality of haul trucks:

determining at least one of a current tire temperature and a current tire pressure;

determining a history of at least one of tire temperature and tire pressure for the first haul truck;

determining a history of at least one of a work load history and a maintenance history for the first haul truck; and determining a prognosis for the first haul truck using the at least one of the current tire temperature and the current tire pressure, and the history of at least one of the work load history and the maintenance history for the first haul truck.

9. The method of claim 8, further comprising modifying an operating regime of at least one of the plurality of haul trucks based upon the prognosis.

10. The method of claim 9, wherein modifying the operating regime includes restricting a maximum speed of at least one of the plurality of haul trucks, or restricting a maximum payload of at least one of the plurality of haul trucks, or dispatching for servicing at least one of the plurality of haul trucks.

11. The method of claim 8, wherein determining the task assignment includes:

identifying a candidate task for at least one of the plurality of haul trucks;

identifying a route through the mining road network associated with the candidate task; and determining a tire cost associated with the route through the mining road network.

12. The method of claim 7, wherein the tire costs for the plurality of edges in the mining road network are determined by a surface type, rolling resistance, gradient, or curvature of at least one of the plurality of edges in the mining road network.

* * * * *